Figure 1:
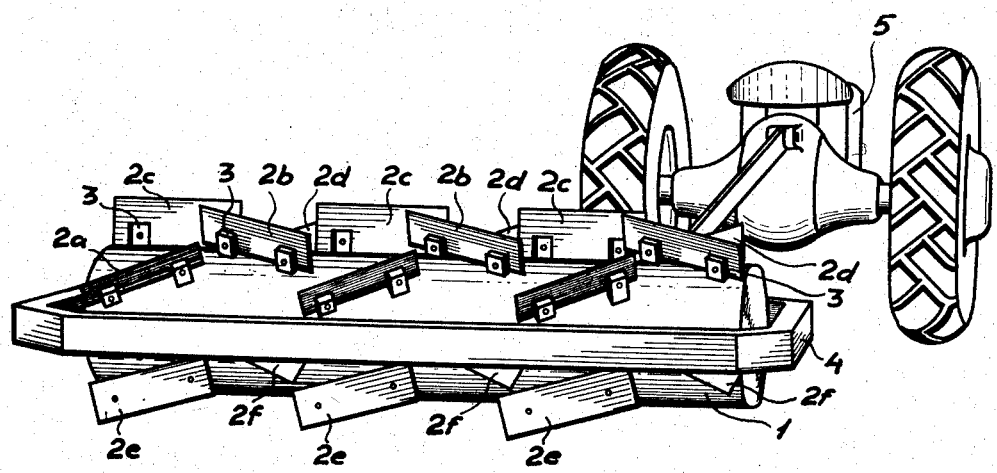

Jan. 27, 1959   B. H. DETHLEFSEN   2,870,850
COMBINED ROTARY SOIL CULTIVATOR AND BRANCH CRUSHER
Filed June 14, 1956   2 Sheets-Sheet 1

INVENTOR.
BORGHILD HARTMANN DETHLEFSEN
BY
ATTORNEY

Jan. 27, 1959  B. H. DETHLEFSEN  2,870,850
COMBINED ROTARY SOIL CULTIVATOR AND BRANCH CRUSHER
Filed June 14, 1956  2 Sheets-Sheet 2

INVENTOR.
BORGHILD HARTMANN DETHLEFSEN
BY
ATTORNEY

United States Patent Office 2,870,850
Patented Jan. 27, 1959

2,870,850

COMBINED ROTARY SOIL CULTIVATOR AND BRANCH CRUSHER

Borghild Hartmann Dethlefsen, Bistrup pr. Birkerod, Denmark

Application June 14, 1956, Serial No. 591,385
Claims priority, application Denmark June 20, 1955

1 Claim. (Cl. 172—554)

This invention relates to a ground working implement, a combined rotary soil cultivator and branch crusher, of the type consisting of a rotatable drum or cylinder of considerable mass, placed on a longitudinal axis, said cylinder being journaled in a frame wholly or partly enclosing the cylinder, said cylinder having cutting members consisting, in the main, of flat knives having straight knife edges, placed in rows along the exterior surface of the drum or cylinder.

When working the ground in plantation or woodland, it is of considerable advantage both economically and operationally to be able to carry out the following tasks in a single, uniform operation
(1) Clearing undesirable plant growths,
(2) Pulverizing weeds, fallen twigs and branches and smaller root growths,
(3) Loosening and working the soil, and
(4) Mixing the soil with the pulverized plant growths and twig and branch waste.

It has not been possible to carry out the simultaneous performance of these tasks in a satisfactory manner with the aid of known ground working implements, such as cultivators, knifeblade cylinders with knife-blades parallel to the axis, disc-harrows, etc.

Some of these known implements, e. g. knife-blade cylinders with knife-blades parallel to the axis are well suited to the pulverization of hard plant parts, e. g. branches, roots, etc., but do not give any satisfactory working of the soil, while others, such as cultivators, horse-hoes and harrows, give a satisfactory ground working but are unable to crush or pulverize the harder parts. In practice, therefore, it has been necessary to use several different implements and so carry out the working in several different stages, which is uneconomical and time consuming.

According to the present invention, the problem is solved by the provision of a ground working implement which is characterized by the fact that the knives are staggered in relation to the axis of the cylinder, in that the knives in one row are placed opposite the intervals between the knives in the neighboring row and form an acute angle with these, and by the fact that each of the knives are so placed that the knife-edge at the one corner is at a greater distance from the surface of the cylinder than at the other corner.

With this construction of the knife-cylinder, by which the invention is characterized, one achieves the result that the rotating knives operate in an effective manner both as cutting and pulverizing members and as ground working members, which in the course of the rotary movement cut up, pulverize and turn the ground. The oblique setting of the knives in relation to the axis of generation of the cylinder and their placing with inclination alternately to the one side and the other, have the effect that branches and twigs which come in under the cylinder are always certain to be completely pulverized, in that there will always be at least one, and in general several knives, which strike the branch or twig transversely. The slope of the knife edge in relation to the surface of the cylinder, so that the one corner always lies farther from the surface than the other—i. e., the knife edge forms an angle with the tangent at the mid-point of the knife to the curve of intersection between the plane of the knife and the surface of the cylinder—has the effect that the knife works both as hoe and ploughshare, in that the upper sharp corner first bores down into the ground and loosens it, whereafter the remaining part of the knife edge follows after and pulverizes and turns the loosened ground. This combined hoeing and shearing effect has likewise significance for the destruction of roots or tree stumps.

In practice, the weight and dimensions of the cylinder also play a part in the effectiveness of the ground working, and it has been shown that in practice a particularly effective ground working is obtained by the use of a concrete-filled cylinder, the length of which is approximately four times its diameter.

The knives, which in practice are preferably constructed of heavy steel plate, are exposed to very powerful mechanical action. They must therefore be fastened so solidly that they can withstand these actions, and, furthermore, in such a manner that they can be easily removed for grinding or repair.

According to the invention, this is achieved by each of the knives being detachably fastened to holders projecting from the surface of the cylinder, these holders being carried through the surface of the cylinder and anchored in a mass filling the interior of same, e. g. a mass of concrete.

Such a method of securing, according to the invention, can be preferably brought about by having each knife fastened to two holders which have flat supporting surfaces for the one side of the knife, and one of said holders being placed radially in relation to the cylinder, and in such a manner that its flat supporting surface forms an acute angle with the axis of generation of the cylinder, while the other holder is placed parallel to the first-mentioned and forms an acute angle with the radius of the cylinder through the fastening point of the knife on the holder.

Figure 2:
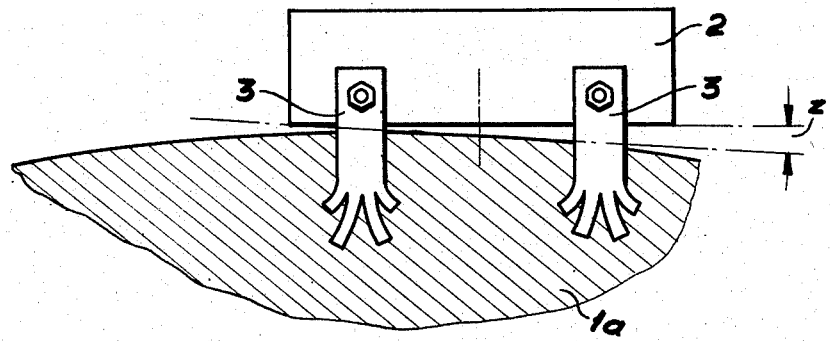
Figure 3:
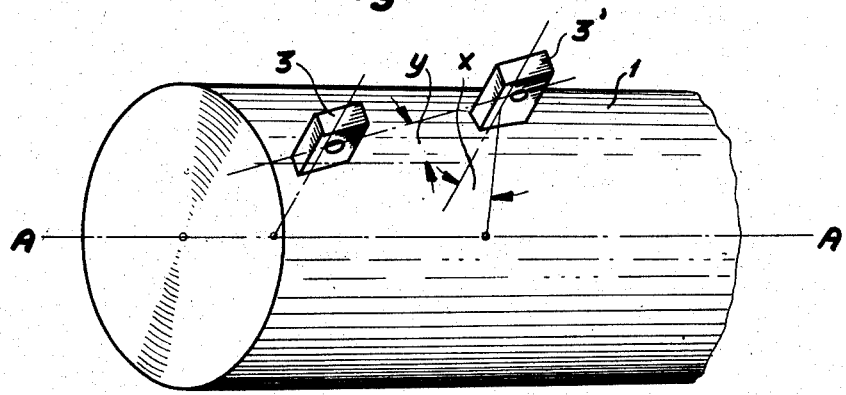

A form of construction of this ground working implement is shown in the drawing, in which Fig. 1 shows a knife-blade cylinder which is coupled to a tractor, seen from behind and in perspective, Fig. 2 shows the attachment of a knife to the surface of the cylinder, seen in section parallel to the plane of the knife, and Fig. 3 shows the placing of a pair of knife holders on the surface of the cylinder, seen in perspective.

In the form of construction shown in the drawing, 1 stands for a cylinder with knives 2, $2a$, $2b$, $2c$, $2d$, $2e$ and $2f$, placed in rows with inclination to opposite sides, said cylinder being journalled at the ends in a frame 4, surrounding the cylinder, said frame being coupled to a tractor 5.

As shown in Fig. 2, each knife 2 is detachably fastened to holders 3 projecting to the cylinder 1, said holders being carried through the surface of the cylinder and anchored in the concrete mass $1a$ filling the inside of same, and the knife 2, which is flat and has a rectangular form, is so placed that it forms an angle $z$ with a line which is parallel to the curve of intersection between the cylinder and the plane of the knife, said curve of intersection being an ellipse. The one corner of the knife-edge thus comes to lie farther from the surface of the cylinder than the other corner.

As shown in Fig. 3, each of the two knife holders 3 and 3' has a flat supporting surface for the one face of the knife, and the holder 3 is placed radially in relation to the cylinder and in such a way that its flat supporting surface forms an acute angle $y$ with the axis of the generation, while the other holder 3' is displaced in relation to the axis of the cylinder and forms an acute angle $x$ with the radius of the cylinder through the attachment point for the knife on this holder.

I claim:

A combined rotary soil cultivator and branch crusher comprising a cylindrical roller formed of concrete provided with a plurality of flat substantially rectangular knives having straight knife edges, each of said knives being detachably fastened to a pair of holders anchored in the concrete mass of the cylindrical roller in such a manner that the knife edge at one corner is at a greater distance from the surface of the cylinder than at the other corner, and in which each pair of knife holders is arranged in such a manner that one of the holders is placed radially in relation to the cylinder, while the other holder is placed parallel to the first mentioned holder and forms an acute angle with the radius of the cylinder through the fastening point of the knife on the holder, each of said holders having a flat supporting surface for fastening one side of the knife thereon.

References Cited in the file of this patent

UNITED STATES PATENTS

| | | |
|---|---|---|
| 342,758 | Munday et al. | May 25, 1886 |
| 822,752 | Moore | June 5, 1906 |
| 1,402,858 | Hamshaw | Jan. 10, 1922 |
| 2,663,131 | Johnson | Dec. 22, 1953 |
| 2,654,982 | Edwards | Oct. 13, 1953 |